United States Patent
Kitabatake et al.

(10) Patent No.: US 7,233,366 B2
(45) Date of Patent: Jun. 19, 2007

(54) METHOD AND APPARATUS FOR SENDING AND RECEIVING AND FOR ENCODING AND DECODING A TELOP IMAGE

(75) Inventors: Yasuhiro Kitabatake, Fujisawa (JP);
Toshirob Hiromitsu, Fujisawa (JP);
Yasushi Tsukamoto, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 10/924,133

(22) Filed: Aug. 23, 2004

(65) Prior Publication Data
US 2005/0057686 A1     Mar. 17, 2005

(30) Foreign Application Priority Data
Aug. 25, 2003  (JP) ............................. 2003-300439

(51) Int. Cl.
*H04N 9/74* (2006.01)
*H04N 9/76* (2006.01)

(52) U.S. Cl. ....................... 348/590; 348/599

(58) Field of Classification Search ............... 348/578, 348/584, 585, 590, 593, 598, 599; 345/592, 345/629, 634; H04N 9/74, 9/76
See application file for complete search history.

(56) References Cited

U.S. PATENT DOCUMENTS 4,970,595 A * 11/1990 Bloomfield ................. 348/590
5,010,407 A * 4/1991 Trytko ........................ 348/591
6,567,128 B1 * 5/2003 Webb et al. ................. 348/584

* cited by examiner

Primary Examiner—Sherrie Hsia
(74) Attorney, Agent, or Firm—William A. Kinnaman, Jr.

(57) ABSTRACT

To allow a telop image to be displayed appropriately even when color information and transparency information for the telop image are transmitted over a network, the present invention provides a telop image sending/receiving system comprising a telop image sending apparatus and a telop image receiving apparatus in which the telop image sending apparatus has an OA fill signal input section for inputting color information for a telop image, an OA key signal input section for inputting transparency information for the telop image, an association storage section for storing color information and transparency information as a pair, a data compression section for compressing data, and a sending section for sending compressed color information and transparency information to a receiving apparatus, and the telop image receiving apparatus has a reception and storage section for receiving and storing the information, a data decompression section for performing data decompression, an OA fill signal output section for outputting color information, and an OA key signal output section for outputting transparency information.

21 Claims, 3 Drawing Sheets

METHOD AND APPARATUS FOR SENDING AND RECEIVING AND FOR ENCODING AND DECODING A TELOP IMAGE

BACKGROUND OF THE INVENTION

1. Technical Field

The present invention relates to a method and apparatus for sending and receiving and for encoding and decoding a telop image. More particularly, this invention relates to such a method and apparatus for transmitting information representing a telop image over a network and to an encoding and decoding method and apparatus for implementing the same.

2. Background Art

Conventionally, the SDI (Serial Digital Interface) standard (e.g., SMPTE 259M) has been employed as an interface for transmitting the video and sound signals for use with the services in the broadcasting station. In this standard, the information representing a telop image includes an OA fill signal indicating color information for a synthesis image and an OA key signal including transparency information indicating a transparency with which an image to be synthesized is displayed through the synthesis image. Conventionally, color information and transparency information are transmitted via independent signal lines, and synthesized synchronously in a unit of frame with a Genlock (Generator lock) signal, for example.

Since no prior art document has been found, description regarding the prior art documents is omitted.

The prior art apparatus, however, is not able to display a telop image appropriately if color information and transparency information in the telop image are transmitted over a transmission path where the amount of delay fluctuates, such as a packet transfer network, for example.

SUMMARY OF THE INVENTION

Therefore, it is an object of the invention to provide a method and apparatus for sending and receiving and for encoding and decoding a telop image which can solve the above problems. This object can be achieved by combining the features of independent claims as defined in the claims of the invention. Also, dependent claims define further advantageous implementations of the invention.

In order to accomplish the above object, according to a first aspect of the invention, there is provided a telop image sending/receiving system including a telop image sending apparatus for sending a telop image and a telop image receiving apparatus for receiving said telop image, wherein the telop image sending apparatus comprises an OA fill signal input section that is connected to a signal line transmitting OA fill signals representing color information for each pixel in the telop image and inputs plural pieces of the color information sequentially, an OA key signal input section that is connected to a signal line transmitting OA key signals including transparency information indicating a transparency with which each pixel in an image to be synthesized with the telop image is displayed through a corresponding pixel in the telop image, and inputs plural pieces of the transparency information sequentially, an association storage section for storing, as a pair for each of a plurality of pixels in the telop image, color information for that pixel inputted by the OA fill signal input section and transparency information for that pixel inputted by the OA key signal input section, a data compression section for performing data compression on the color information and transparency information for the pixels in the telop image using a pair of color information and transparency information stored in the association storage section as a unit of data, and a sending section for sequentially sending the pairs of color information and transparency information compressed by the data compression section through a common signal line to a receiving apparatus, and the telop image receiving apparatus comprises a reception and storage section for sequentially receiving and storing the information representing a telop image, a data decompression section for generating plural pieces of pixel information representing the respective pixels to be displayed as the telop image by performing data decompression on the information stored by the reception and storage section, an OA fill signal output section that is connected to a signal line transmitting OA fill signals representing color information for each pixel of the telop image, and sequentially outputs color information included in each of the plural pieces of pixel information generated, and an OA key signal output section that is connected to a signal line transmitting OA key signals including transparency information indicating a transparency with which each pixel of an image to be synthesized with the telop image is displayed through a corresponding pixel of the telop image, and sequentially outputs, for each of the plural pieces of pixel information generated, transparency information included in that pixel in synchronization with the output of the color information included in that pixel.

The above outline of the invention does not list all the features requisite for the invention, and the invention may be made by partially combining these features.

According to this invention, a telop image can be appropriately displayed even when color information and transparency information in the telop image are transmitted over a network.

DESCRIPTION OF PREFERRED EMBODIMENTS

While the preferred embodiments of the invention will be described below, it should be noted that such embodiments do not limit the invention as defined in the claims and that all the combinations of the features described in the embodiments are not requisite for the solving means of the invention.

Figure 1:
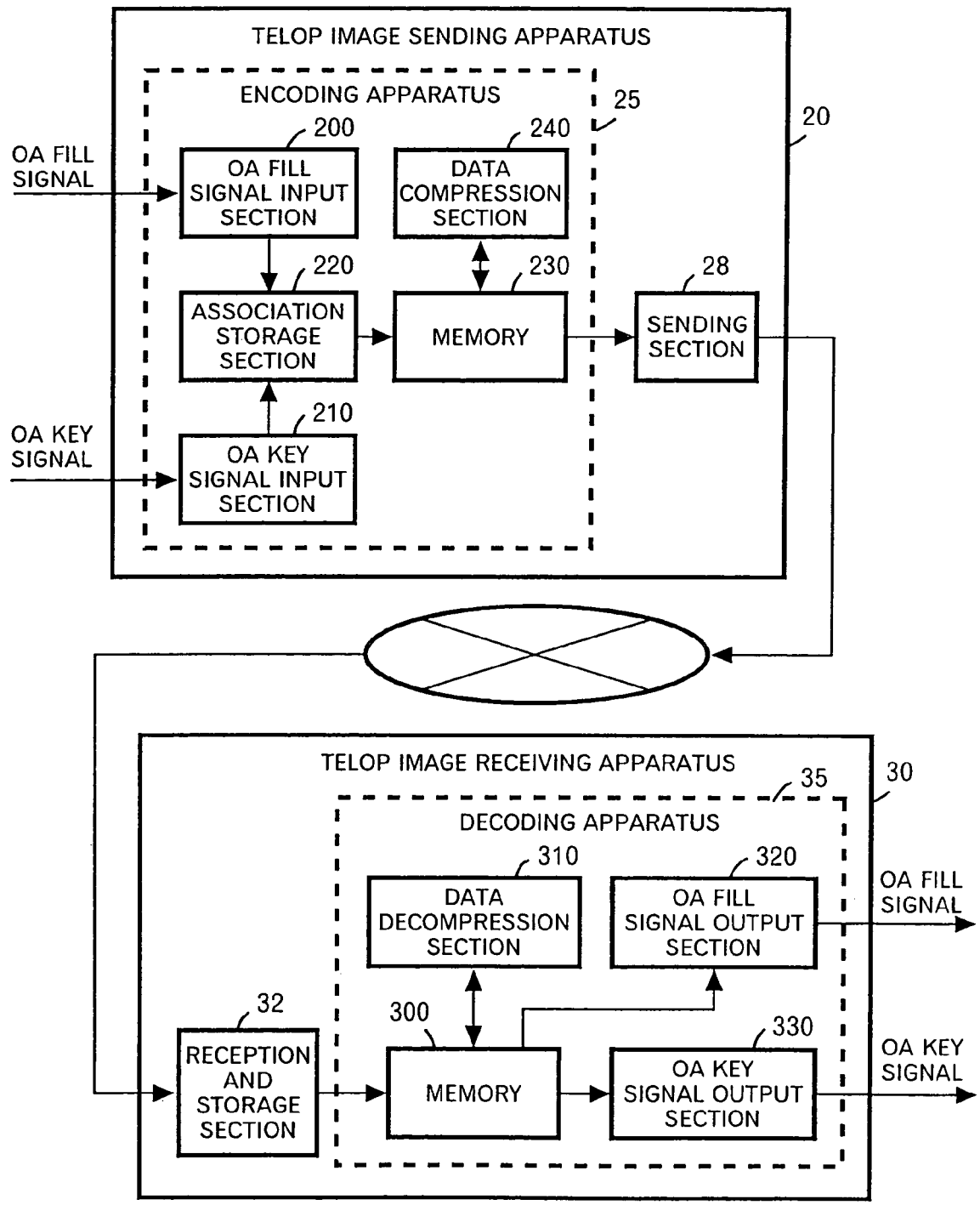
FIG. 1 is a block diagram of a telop image sending/receiving system 10 for communicating telop image information representing a telop image.

FIG. 1 shows a block diagram of a telop image sending/receiving system 10 for communicating telop image information representing a telop image. The telop image sending/receiving system 10 comprises a telop image sending apparatus 20 for sending the telop image information and a telop image receiving apparatus 30, which is connected to the telop image sending apparatus 20 over a network, for receiving the telop image information.

The telop image sending apparatus 20 inputs color information for each pixel in a telop image and transparency information indicating a transparency with which each pixel in an image to be synthesized with the telop image is displayed through a corresponding pixel in the telop image via an OA fill signal line and an OA key signal line, respectively, which are independent from each other, and sends a pair of color information and transparency information through a common signal line to the telop image receiving apparatus 30 over the network. The telop image receiving apparatus 30 receives the telop image information from the telop image sending apparatus 20, and outputs the color information and transparency information in the telop image to an OA fill signal line and an OA key signal line, respectively, which are independent from each other.

The telop image sending/receiving system 10 according to this embodiment aims at displaying the telop image appropriately by sending the input color information and transparency information over, for example, a packet transfer network, and synchronously outputting the color information and transparency information on the receiving side.

The telop image sending apparatus 20 has an encoding apparatus 25 and a sending section 28. The encoding apparatus 25 comprises an OA fill signal input section 200, an OA key signal input section 210, an association storage section 220, a memory 230, and a data compression section 240, and encodes the telop image information into a data format to be sent to the telop image receiving apparatus 30. The encoding apparatus 25 may be an extension card according to a bus standard such as PCI (Peripheral Component Interconnect), which is inserted into the telop image sending apparatus 20.

The OA fill signal input section 200 is connected to the OA fill signal line transmitting OA fill signals representing color information for each pixel in the telop image, and inputs plural pieces of color information sequentially. The OA key signal input section 210 is connected to the OA key signal line transmitting OA key signals including transparency information indicating a transparency with which each pixel in an image to be synthesized with the telop image is displayed through a corresponding pixel in the telop image, and inputs plural pieces of transparency information sequentially.

The association storage section 220 stores, as a pair for each of a plurality of pixels in the telop image, color information for that pixel inputted by the OA fill signal input section 200 and transparency information for that pixel inputted by the OA key signal input section 210 in the memory 230. The association storage section 220 associates, for each pixel, color information and transparency information, which have been synchronized with each other, frame by frame in a telop image. Alternatively, the association storage section 220 may associate, for each pixel, color information and transparency information after synchronizing them with each other frame by frame in a telop image in accordance with a Genlock signal.

The data compression section 240 performs data compression on color information and transparency information for a plurality of pixels in the telop image stored in the memory 230 by using a pair of color information and transparency information as a unit of data. Specifically, the data compression section 240 may perform compression processing such as MPEG, Motion JPEG and binary compression. The data compression section 240 stores pairs of compressed color information and transparency information in the memory 230.

The sending section 28 sends the pairs of color information and transparency information compressed by the data compression section 240 and stored in the memory 230 through the common signal line to the telop image receiving apparatus 30 over the network such as Gigabit Ethernet®. Also, the sending section 28 sends a pair of color information and transparency information for the same pixel over the network in a manner that the pair is not transmitted across plural packets so that the color information and transparency information can be obtained from the same packet when the pair of color information and transparency information compressed by the data compression section 240 is decompressed in the telop image receiving apparatus 30.

The telop image receiving apparatus 30 has a reception and storage section 32 and a decoding apparatus 35. The reception and storage section 32 sequentially receives the telop image information from the sending section 28, and stores it in the decoding apparatus 35. The decoding apparatus 35 comprises a memory 300, a data decompression section 310, an OA fill signal output section 320, and an OA key signal output section 330, and decodes the received data into telop image information in the telop image sending/receiving system 10. The decoding apparatus 35 may be an extension card according to the bus standard such as PCI, which is inserted into the telop image receiving apparatus 30. The memory 300 stores the telop image information received from the reception and storage section 32. The data decompression section 310 generates plural pieces of pixel information representing the respective pixels to be displayed as the telop image by performing data decompression on the telop image information received from the reception and storage section 32 and stored in the memory 300, and stores the plural pieces of pixel information in the memory 300.

The OA fill signal output section 320 is connected to the OA fill signal line transmitting OA fill signals representing color information for each pixel of the telop image. The OA fill signal output section 320 sequentially outputs color information included in each of the plural pieces of image information generated by the data decompression section 310 and stored in the memory 300 via the OA fill signal line connected to the telop image receiving apparatus 30. The OA fill signal output section 320 may output color information by synchronizing the telop image with the Genlock signal frame by frame.

The OA key signal output section 330 is connected to the OA key signal line transmitting OA key signals including transparency information indicating a transparency with which each pixel of an image to be synthesized with the telop image is displayed through a corresponding pixel of the telop image. The OA key signal output section 330 sequentially outputs, for each of the plural pieces of pixel information generated by the data decompression section 310 and stored in the memory 300, transparency information included in that pixel in synchronization with output of color information included in that pixel in the OA fill signal output section 320, via the OA key signal line connected to the telop image receiving apparatus 300. The OA key signal output section 330 may output transparency information by synchronizing the telop image with the Genlock signal frame by frame.

In this way, the telop image sending/receiving system 10 sends an OA fill signal and an OA key signal inputted via different signal lines over a packet transfer network, for example, and outputs the OA fill signal and the OA key signal synchronized for each pixel. Therefore, even if an apparatus for creating a telop image and an apparatus for synthesizing the telop image into a synthesized image are connected over a network, the telop image information is transmitted correctly.

Also, the telop image sending/receiving system 10 compresses the telop image information and sends it at a high rate. Therefore, even if the apparatus for creating the telop image and the apparatus for synthesizing the telop image into synthesized image are connected over the network, the telop image information is synthesized in real time.

Figure 2:
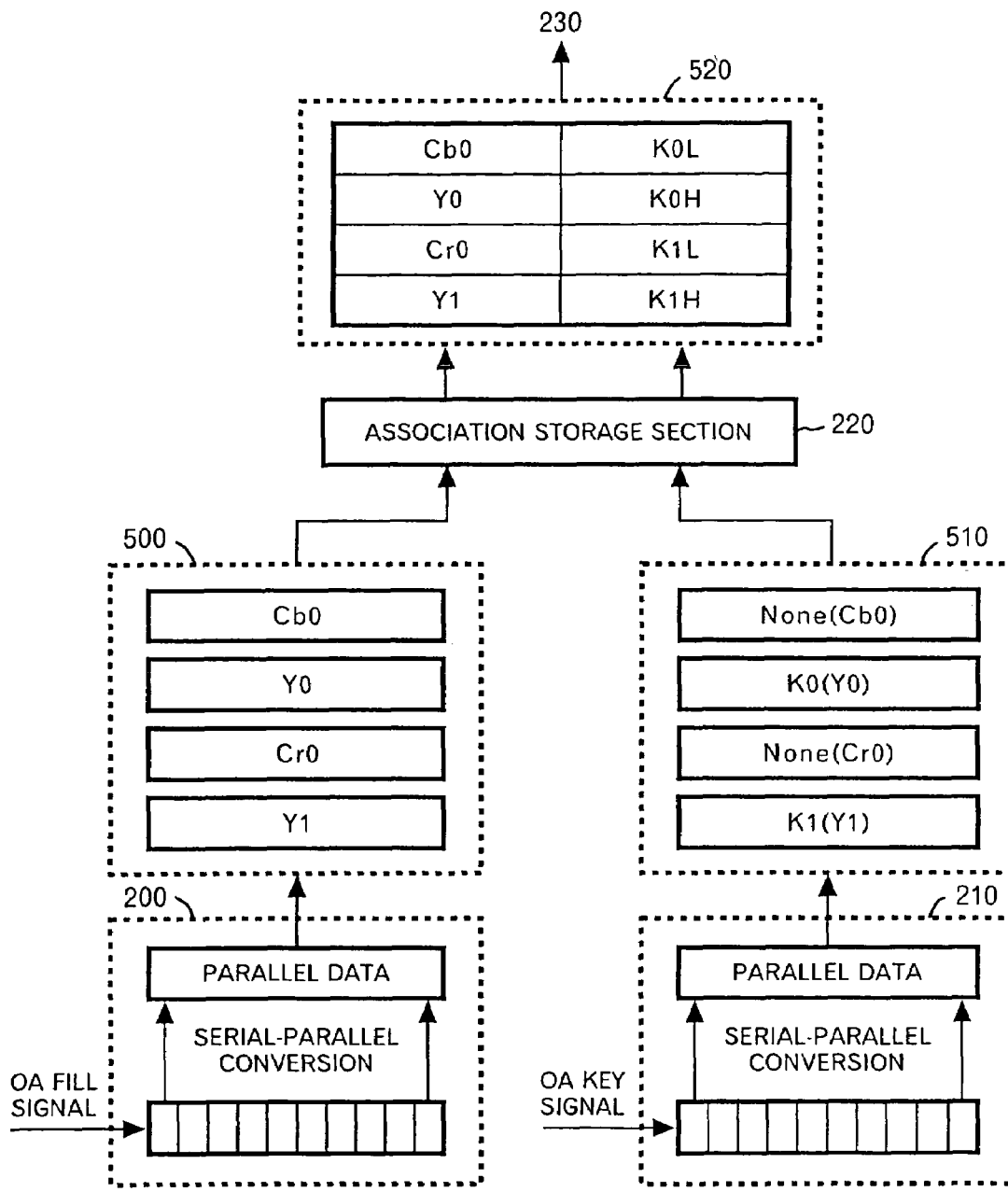
FIG. 2 is a diagram showing one example of a method for storing color information 500 and transparency information 510 as pair information 520 by an OA fill signal input section 200, an OA key signal input section 210 and an association storage section 220.

FIG. 2 shows one example of a method for storing color information 500 and transparency information 510 as pair information 520 by the OA fill signal input section 200, the OA key signal input section 210 and the association storage section 220.

The OA fill signal input section 200 sequentially inputs, as an OA fill signal, a luminance signal representing a luminance component and a color difference signal representing a color difference component for each pixel in the telop image. The OA fill signal input section 200 generates color information 500 by performing, for example, serial-parallel conversion on the data of the input OA fill signal to take out data in a unit of 10 bits that is a data size of each component in the color information. The OA fill signal input section 200 may reduce the data size of each component in the color information 500 from 10 bits to 8 bits, for example, to perform processing such as compression at a higher rate. The color information 500 includes Cb0 and Cr0 that are common color difference components in two consecutive pixels, and Y0 and Y1 that are luminance components thereof.

The OA key signal input section 210 sequentially inputs, as an OA fill signal, a luminance signal and a color difference signal for each pixel in the telop image. The OA key signal input section 210 generates transparency information 510 by performing serial-parallel conversion on the data of the input OA key signal to take out data in a unit of 10 bits that is a data size of each component in the transparency information. The OA key signal input section 210 may reduce the data size of each component in the transparency information 510 from 10 bits to 8 bits, for example, to perform processing such as compression at a higher rate.

The transparency information 510 includes Cb0 and Cr0 that are common color difference components in two consecutive pixels, and Y0 and Y1 that are luminance components thereof. However, the OA key signal input section 210 uses, as the transparency information 510, only the transparencies K0 and K1 indicated by the luminance components Y0 and Y1, and does not use the color difference components Cb0 and Cr0 (None).

The association storage section 220 stores the transparency information 510 inputted as a luminance signal in an OA key signal inputted by the OA key signal input section 210 and the color information 500 represented by an OA fill signal inputted by the OA fill signal input section 200 as pair information 520 consisting of a pair of color information and transparency information, in the memory 230. In this embodiment, the association storage section 220 stores K0 and K1 that are luminance signals in the transparency information 510 and the color information 500 as the pair information 520 in the memory 230. More specifically, the association storage section 220 divides each of K0 and K1 into an upper part and a lower part, associates the lower part (K0L) of K0 with Cb0, the upper part (K0H) of K0 with Y0, the lower part (K1L) of K1 with Cr0, and the upper part (K1H) of K1 with Y1, and stores the color information 500 and transparency information 510 as the pair information 520 in the memory 230. Herein, the association storage section 220 stores the color information 500 and transparency information 510 as the pair information 520 in the memory 230 by storing, for each pixel of the telop image, the transparency information 510 of that pixel at an address that is determined by adding a predetermined offset value to an address in the memory where the color information 500 of that pixel is stored. For example, the association storage section 220 stores Cb0 and K0L as a pair by storing K0L at an address that is determined by adding a predetermined offset value to an address in the memory 230 where Cb0 is stored.

The configuration of FIG. 2 is only illustrative, and may be changed in various ways. For example, the color information 500 and transparency information 510 may contain information for only one pixel. Also, the OA key signal input section 210 may use the color difference component in addition to the luminance component as the transparency information 510. In this case, the association storage section 220 associates the components of the color information 500 and transparency information 510 as the pair information 520 and stores the pair information in the memory 230.

Thus, the telop image sending/receiving system 10 can associate the color information 500 represented by the input OA fill signal with the transparency information 510 included in the input OA key signal, pixel by pixel. Thereby, the telop image sending/receiving system 10 can synchronize the OA fill signal with the OA key signal correctly, pixel by pixel.

Figure 3:
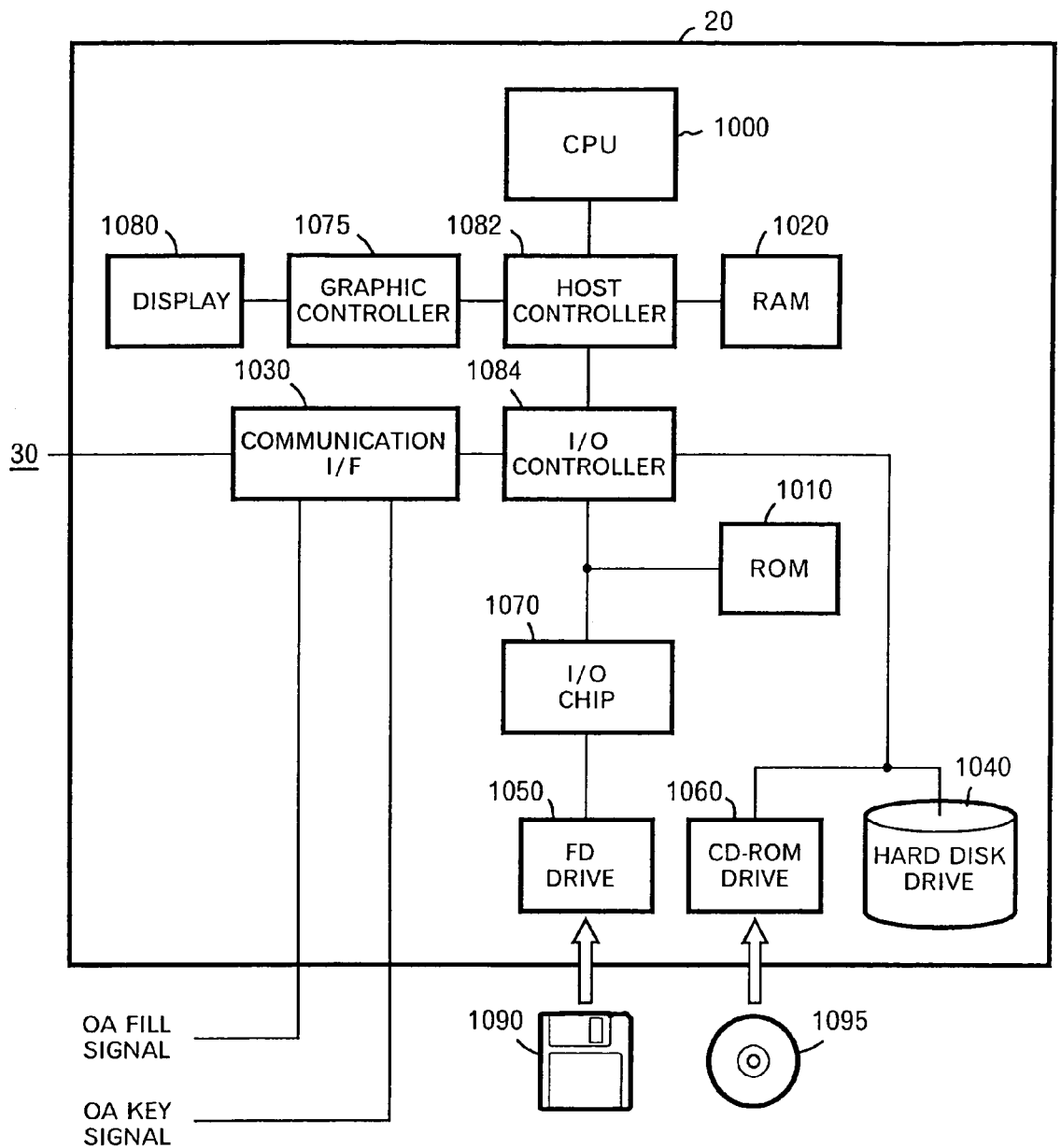
FIG. 3 is a diagram showing one example of the hardware configuration of a telop image sending apparatus 20 according to an embodiment of the invention.

FIG. 3 shows one example of the hardware configuration of the telop image sending apparatus 20 according to the embodiment of the invention. The telop image sending apparatus 20 comprises a CPU-related section having a CPU 1000, a RAM 1020, a graphic controller 1075, and a display unit 1080 that are interconnected by a host controller 1082, an input/output section having a communication interface 1030, a hard disk drive 1040, and a CD-ROM drive 1060 that are connected to the host controller 1082 by an input/output controller 1075, and a legacy input/output section having a ROM 1010, a flexible disk drive 1050, and an input/output chip 1070 that are connected to the input/output controller 1084.

The host controller 1082 connects the RAM 1020 with the CPU 1000 accessing the RAM 1020 at a high transfer rate and the graphic controller 1075. The CPU 1000 operates to control each section in accordance with programs stored in the ROM 1010 and RAM 1020. The graphic controller 1075 acquires image data generated by the CPU 1000 on a frame buffer provided in the RAM 1020, and displays it on the display unit 1080. Alternatively, the graphic controller 1075 may internally contain the frame buffer for storing the image data generated by the CPU 1000.

The input/output controller 1084 connects the host controller 1082 with the communication interface 1030, the hard disk drive 1040 and the CD-ROM drive 1060, which are relatively fast peripheral devices. The communication interface 1030 is connected to an external device, for example, the telop image receiving apparatus 30 over the network. The communication interface 1030 may input the OA fill signal and the OA key signal over another network. The hard disk drive 1040 stores programs and data used by the telop image sending apparatus 20. The CD-ROM drive 1060 reads a program or data from a CD-ROM 1095 and provides it via the RAM 1020 to the input/output chip 1070.

The ROM 1010 and a relatively slow input/output device such as the flexible disk drive 1050 or input/output chip 1070 are connected to the input/output controller 1084. The ROM 1010 stores a boot program executed by the CPU 1000 at the time of starting the telop image sending apparatus 20, and programs dependent on the hardware of the telop image sending apparatus 20. The flexible disk drive 1050 reads a program or data from a flexible disk 1090 and provides it via the RAM 1020 to the input/output chip 1070. The input/output chip 1070 connects the flexible disk 1090 and various kinds of input/output devices via a parallel port, a serial port, a keyboard port and/or a mouse port.

The program provided to the telop image sending apparatus 20 is stored in a recording medium such as the flexible disk 1090, CD-ROM 1095 or IC card, and provided by the user. The program is read from the recording medium via the input/output chip 1070 and/or the input/output controller 1084.

The program provided to the telop image sending apparatus 20 may contain an association storage module and a data compression module. In this case, the association storage module and the data compression module cause the telop image sending apparatus 20 to operate as the association storage section 220 and the data compression section 240, respectively.

Also, the telop image sending apparatus 20 may provide the read program to the telop image receiving apparatus 30 over the network. The program provided to the telop image receiving apparatus 30 may contain a data decompression module. In this case, the data decompression module causes the telop image receiving apparatus 30 to operate as the data decompression section 310.

The above program may be stored in an external recording medium. The recording medium may be the flexible disk 1090, the CD-ROM 1095, an optical recording medium such as DVD or PD, a magneto-optic recording medium such as MD, a tape medium, or a semiconductor memory such as an IC card. Furthermore, a storage device such as a hard disk or a RAM provided in a server system connected to a private communication network or the Internet may be used as the recording medium to provide the program to the telop image sending apparatus 20 over the network.

As described above, the telop image sending/receiving system 10 sends the OA fill signal and the OA key signal inputted via different signal lines over the packet transfer network, and outputs the OA fill signal and the OA key signal synchronized for each pixel. Therefore, even if the apparatus for creating the telop image and the apparatus for synthesizing the telop image into synthesized image are connected over the network, the telop image information can be synchronized correctly and transmitted.

While the embodiments of this invention have been described above, the technical scope of the invention is not limited to the described embodiments. It will be apparent to those skilled in the art that various changes or modifications may be made to the above embodiments. The changed or modified embodiments may also be included in the technical scope of the invention as defined in the claims.

What is claimed is:

1. Apparatus for sending information representing a telop image, comprising:
   a fill signal input section that is connected to a signal line transmitting fill signals representing color information for each pixel in said telop image and inputs plural pieces of said color information sequentially;
   a key signal input section that is connected to a signal line transmitting key signals including transparency information indicating a transparency with which each pixel in an image to be synthesized with said telop image is displayed through a corresponding pixel in said telop image and inputs plural pieces of said transparency information sequentially;
   an association storage section for storing, as a pair for each of a plurality of pixels in said telop image, color information inputted by said fill signal input section and transparency information inputted by said key signal input section;
   a data compression section for performing data compression on the color information and transparency information for the pixels in said telop image using a pair of color information and transparency information stored in said association storage section as a unit of data; and
   a sending section for sequentially sending the pairs of color information and transparency information compressed by said data compression section through a common signal line to a receiving apparatus.

2. The apparatus of claim 1 in which said association storage section stores, for each pixel of said telop image, color information and transparency information as a pair in which said transparency information is stored at an address that is determined by adding a predetermined offset value to an address at which said color information is stored.

3. The apparatus of claim 1 in which said sending section sends a pair of color information and transparency information for the same pixel over a network in such a manner that the pair is not transmitted across plural packets.

4. The apparatus of claim 1 in which said key signal input section sequentially inputs a luminance signal and a color difference signal for each pixel as a key signal and in which said association storage section stores said transparency information inputted as said luminance signal and said color information as a pair among said key signals inputted by said key signal input section.

5. Apparatus for receiving information representing a telop image, comprising:
   a reception and storage section for sequentially receiving and storing information representing a telop image;
   a data decompression section for generating plural pieces of pixel information representing respective pixels to be displayed as said telop image by performing data decompression on the information stored by said reception and storage section;
   a fill signal output section that is connected to a signal line transmitting fill signals representing color information for each pixel of said telop image and sequentially outputs color information included in each of said plural pieces of pixel information; and
   a key signal output section that is connected to a signal line transmitting key signals including transparency information indicating a transparency with which each pixel of an image to be synthesized with said telop image is displayed through a corresponding pixel of said telop image and sequentially outputs, for each of said plural pieces of pixel information, transparency information included in that pixel information in synchronization with the outputting by said fill signal output section of the color information included in that pixel information.

6. A telop image sending/receiving system including a telop image sending apparatus for sending a telop image and a telop image receiving apparatus for receiving said telop image, wherein said telop image sending apparatus comprises:
   a fill signal input section that is connected to a signal line transmitting fill signals representing color information for each pixel in said telop image and inputs plural pieces of said color information sequentially;

a key signal input section that is connected to a signal line transmitting key signals including transparency information indicating a transparency with which each pixel in an image to be synthesized with said telop image is displayed through a corresponding pixel in said telop image and inputs plural pieces of said transparency information sequentially;

an association storage section for storing, as a pair for each of a plurality of pixels in said telop image, color information inputted by said fill signal input section and transparency information inputted by said key signal input section;

a data compression section for performing data compression on the color information and transparency information for the pixels in said telop image using a pair of color information and transparency information stored in said association storage section as a unit of data; and a sending section for sequentially sending the pairs of color information and transparency information compressed by said data compression section through a common signal line to the receiving apparatus, and said telop image receiving apparatus comprises:

a reception and storage section for sequentially receiving and storing information representing a telop image;

a data decompression section for generating plural pieces of pixel information representing respective pixels to be displayed as said telop image by performing data decompression on the information stored by said reception and storage section;

a fill signal output section that is connected to a signal line transmitting fill signals representing color information for each pixel of said telop image and sequentially outputs color information included in each of said plural pieces of pixel information; and a key signal output section that is connected to a signal line transmitting key signals including transparency information indicating a transparency with which each pixel of an image to be synthesized with said telop image is displayed through a corresponding pixel of said telop image and sequentially outputs, for each of said plural pieces of pixel information, transparency information included in that pixel information in synchronization with the outputting by said fill signal output section of the color information included in that pixel information.

7. Apparatus for encoding information representing a telop image, comprising:

a fill signal input section that is connected to a signal line transmitting fill signals representing color information for each pixel in said telop image and inputs plural pieces of said color information sequentially;

a key signal input section that is connected to a signal line transmitting key signals including transparency information indicating a transparency with which each pixel in an image to be synthesized with said telop image is displayed through a corresponding pixel in said telop image and inputs plural pieces of said transparency information sequentially;

an association storage section for storing, as a pair for each of a plurality of pixels in said telop image, color information inputted by said fill signal input section and transparency information inputted by said key signal input section; and a data compression section for performing data compression on the color information and transparency information for the pixels in said telop image using a pair of color information and transparency information stored in said association storage section as a unit of data.

8. Apparatus for decoding received data into information representing a telop image, comprising:

a data decompression section for generating plural pieces of pixel information representing respective pixels to be displayed as said telop image by performing data decompression on information representing said telop image;

an fill signal output section that is connected to a signal line transmitting fill signals representing color information for each pixel of said telop image and sequentially outputs color information included in each of said plural pieces of pixel information; and an key signal output section that is connected to a signal line transmitting key signals including transparency information indicating a transparency with which each pixel of an image to be synthesized with said telop image is displayed through a corresponding pixel of said telop image and sequentially outputs, for each of said plural pieces of pixel information, transparency information included in that pixel information in synchronization with the outputting by said fill signal output section of the color information included in that pixel information.

9. A method for encoding information representing a telop image, comprising the steps of:

sequentially inputting fill signals representing color information for each pixel in said telop image;

sequentially inputting key signals including transparency information indicating a transparency with which each pixel in an image to be synthesized with said telop image is displayed through a corresponding pixel in said telop image;

storing, as a pair for each of a plurality of pixels in said telop image, color information represented by said fill signals and transparency information included in said key signals; and performing data compression on the color information and transparency information for the pixels in said telop image using a stored pair of color information and transparency information as a unit of data.

10. The method of claim 9, further comprising the step of:

sequentially sending the pairs of color information and transparency information on which said data compression was performed on a common signal line.

11. The method of claim 10 in which, for each pixel of said telop image, color information and transparency information are stored as a pair in which said transparency information is stored at an address that is determined by adding a predetermined offset value to an address at which said color information is stored.

12. The method of claim 10 in which a pair of color information and transparency information for the same pixel is sent over a network in such a manner that the pair is not transmitted across plural packets.

13. The method of claim 10 in which a luminance signal and a color difference signal are sequentially inputted for each pixel as a key signal and in which said storing step stores said transparency information inputted as said luminance signal and said color information as a pair among said key signals inputted by said step of sequentially inputting key signals.

14. The method of claim 10, further comprising the steps of:

sequentially receiving and storing information on said signal line representing a telop image;

generating plural pieces of pixel information representing respective pixels to be displayed as said telop image by performing data decompression on said information representing said telop image;

transmitting fill signals representing color information for each pixel of said telop image by sequentially outputting color information included in each of said plural pieces of pixel information; and transmitting key signals including transparency information indicating a transparency with which each pixel of an image to be synthesized with said telop image is displayed through a corresponding pixel of said telop image by sequentially outputting, for each of said plural pieces of pixel information, transparency information included in that pixel information in synchronization with the outputting of the color information included in that pixel information.

15. A program storage device readable by a machine, tangibly embodying a program of instructions executable by the machine to perform the method steps of claim 14.

16. A program storage device readable by a machine, tangibly embodying a program of instructions executable by the machine to perform the method steps of claim 10.

17. A program storage device readable by a machine, tangibly embodying a program of instructions executable by the machine to perform the method steps of claim 9.

18. A method for decoding received data into information representing a telop image, comprising the steps of:

generating plural pieces of pixel information representing respective pixels to be displayed as said telop image by performing data decompression on information representing said telop image;

transmitting fill signals representing color information for each pixel of said telop image by sequentially outputting color information included in each of said plural pieces of pixel information; and transmitting key signals including transparency information indicating a transparency with which each pixel of an image to be synthesized with said telop image is displayed through a corresponding pixel of said telop image by sequentially outputting, for each of said plural pieces of pixel information, transparency information included in that pixel information in synchronization with the outputting of the color information included in that pixel information.

19. The method of claim 18, further comprising the step of:

sequentially receiving and storing information representing a telop image, said data decompression being performed on said information representing said telop image.

20. A program storage device readable by a machine, tangibly embodying a program of instructions executable by the machine to perform the method steps of claim 19.

21. A program storage device readable by a machine, tangibly embodying a program of instructions executable by the machine to perform the method steps of claim 18.

* * * * *